S. KELTONIK.
INSECT TRAP.
APPLICATION FILED MAR. 31, 1914.
1,173,809.
Patented Feb. 29, 1916.
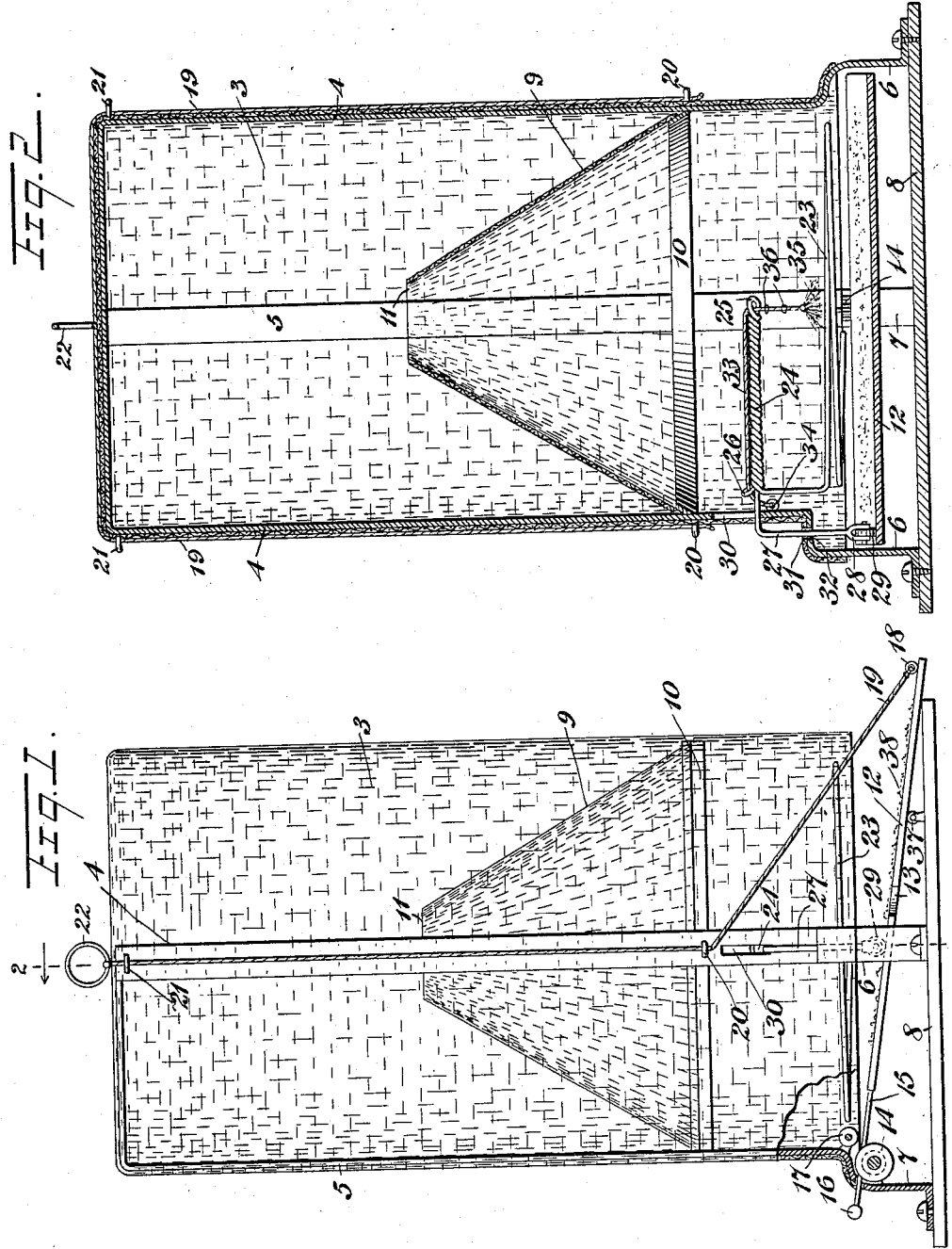
WITNESSES
H. J. Walker
Walton Harrison
INVENTOR
Stephen Keltonik
BY
ATTORNEYS

UNITED STATES PATENT OFFICE.

STEPHEN KELTONIK, OF CONEMAUGH, PENNSYLVANIA.

INSECT-TRAP.

1,173,809.  Specification of Letters Patent.  Patented Feb. 29, 1916.

Application filed March 31, 1914. Serial No. 828,500.

*To all whom it may concern:*

Be it known that I, STEPHEN KELTONIK, a citizen of the United States, residing at Conemaugh, in the county of Cambria and State of Pennsylvania, have invented certain new and useful Improvements in Insect-Traps, of which the following is a specification.

My invention relates to traps of a kind suitable for capturing flies and other insects, my more particular purpose being to enable the operator, at intervals, to readily drive completely into the trap such insects as have started into the trap but have not passed the portions thereof which prevent the retrogression of the insects.

Reference is made to the accompanying drawings forming a part of this specification, and in which like letters indicate like parts.

Figure 1 is a side view, partly in elevation and partly broken away, showing my trap complete. Fig. 2 is a section, on the line 2 of Fig. 1, looking in the direction of the arrow.

A substantially cylindrical member 3, made of gauze or wire netting, constitutes the body portion of the trap. A brace 4, having roughly the form of an inverted U, is connected with another brace 5, secured to said first-mentioned brace at the top thereof. The braces 4 and 5 support the body portion 3 of the trap, and are provided with portions 6, 7 which serve as legs for supporting the trap, and are for this purpose secured upon a base 8.

The trap throat is shown at 9, and has the form of a cone frustum. It is supported by a ring 10, and is provided at its upper end with an opening 11. A plate 12, serving the purpose of a movable or false floor, is located adjacent the lower end of the trap body, and is provided with a notch 13 extending into one of the edges of the plate, as indicated in Fig. 1.

A friction wheel 14 is journaled inside of the leg 7, and engaging this friction wheel is a rod 15, which supports one edge of the plate 12 and which extends through the leg. This rod is provided with a knob 16, serving as a handle for actuating the plate 12. Another friction wheel 17 is disposed adjacent the friction wheel 14, and is carried by the brace 5. When the plate 12 is in its horizontal position, the rod 15 engages the friction wheel 17. The plate 12 is provided with two eyes 18, and secured to the latter are two cords 19. These cords extend through eyes 20, 21 carried by the braces 4, and are both secured to a ring 22. Located within the lower portion of the trap body is a spiral 23 consisting of one or two turns of spring wire. A portion of this wire is wound around at 24 so as to form a rod-like member, the latter being provided with two loops 25, 26. Another portion 27 of the wire extends outwardly through a slot 30 with which the brace 4 is provided and downwardly, as indicated in Fig. 2, and at its lower end carries a bearing 28 in which is mounted a small friction wheel 29. The parts are so proportioned and arranged that the portion 27 of wire, which thus constitutes an arm, and its wheel 29, may drop through notch 13 during upward movement of plate 12 for a purpose to be hereinafter described.

The arm 27 extends through holes 31, 32 in the gauze body and the leg 6.

A cord 33 is secured to an eye 34 carried by the brace 4, and extends through the loops 26 and 25. This cord is provided with knots 36, and with a tassel 35, these knots and the tassel hanging just below the loop 25.

A friction wheel 37 (see bottom of Fig. 1) is engaged by the plate 12, when the latter occupies its normal position. A quantity of bait 38, resting upon the plate 12, is used for the purpose of luring the insects into the trap.

The trap is set by letting the ring 22 down. In doing this, the weight of the plate 12 causes the plate to incline and also to move obliquely downward to the right, according to Fig. 1. The bait 38 is next placed upon the plate 12.

The operation of my device is as follows: The parts being assembled and arranged as described and the plate 12 being brought into its normal position as indicated in Fig. 1, the bait 38 is next thrown upon the plate as above described. Insects attracted by the bait 38 now readily enter the portion of the trap below the throat 9, and running or crawling upwardly through the opening 11 are unable to get out of the trap. Large numbers of the insects, however, gather in the lower portion of the trap, and are likely to go out of the lower end of the trap body, instead of passing through the opening 11. When the operator notices a large collection of insects within the lower portion of the trap body, as just described, he grasps the ring 22 and pulls the same directly upward. The cords 19 thus lift one edge of the plate 12, so that this plate rises and lodges against the lower end of the trap body. The friction wheel 29 rolls slightly upon the upper edge of the plate 12, and when this plate is about level, the wheel 29 and a portion of the arm 27 drop through the notch 13. The wire member 24 is by these movements agitated violently, and a more or less jerky movement is thus momentarily conferred upon the cord 33. The tassel 35 and knots 36 are therefore swung violently back and forth, and oftentimes give a whirling motion. At the same instant, the spiral 23 of wire is thrown violently into vibration. The movements of this spiral of spring wire, and of the tassel 35 and knots 36, scare the insects and drive them upwardly, so that they pass through the opening 11 and are now unable to leave the trap. They may now be destroyed in the usual or any desired manner.

In practice, whenever the operator sees a large number of insects below the throat 9, he merely gives the ring 22 a gentle jerk upward, holds it for a moment, and then releases it. By doing this at intervals during the day, he greatly increases the capacity of the trap to capture insects. Each time a group of insects is driven upwardly through the opening 11 as above described, the lower portion of the trap is of course left free of insects, and the entrance of other insects is therefore correspondingly rapid—the principle being that, other things being equal, insects will enter in larger numbers into a region where no other insects are present.

I find that the spiral member 23 of spring wire constitutes a very effective scare for insects and particularly for flies. This is also true of the tassel 35 and knots 36.

I do not limit myself to the precise construction shown, as variations may be made therein without departing from the spirit of my invention.

Having thus described my invention, what I claim as new and desire to secure by Letters Patent is as follows:

1. An insect trap comprising a hollow body member, a throat located within said hollow body member, a vibratory member of spring wire located within said body member at a point adjacent said throat for the purpose of driving insects through said throat, and means for actuating said vibratory member.

2. In an insect trap, the combination of a body member, a throat located within said body member, a vibratory member adjacent the throat, a cord mounted through a portion of the vibratory member at a point adjacent said throat and provided with a tassel, and means for actuating said vibratory member in order to agitate the cord and its tassel and drive insects through said throat.

3. In an insect trap, the combination of a body member, a throat located within the body member, a vibratory mechanism arranged adjacent to the throat for frightening insects into the throat and including a member having a depending arm, and a plate disposed below the said mechanism and on which said arm normally rests, said plate being movable upwardly and downwardly to open and close the body member and having a notch through which said arm may drop during rising movement of the plate, whereby to actuate the said vibratory mechanism.

In testimony whereof I have signed my name to this specification in the presence of two subscribing witnesses.

STEPHEN KELTONIK.

Witnesses:
 AMOS J. HARGREAVES,
 T. ROSS KEPPLE.

Copies of this patent may be obtained for five cents each, by addressing the "Commissioner of Patents, Washington, D. C."